(12) United States Patent
Bhatt et al.

(10) Patent No.: US 8,122,127 B2
(45) Date of Patent: Feb. 21, 2012

(54) AUTOMATIC AGGREGATION OF INTER-DEVICE PORTS/LINKS IN A VIRTUAL DEVICE

(75) Inventors: Megh Bhatt, Santa Clara, CA (US);
Harshad Nakil, San Jose, CA (US);
Rajashekar Reddy, San Jose, CA (US);
Saurabh Agarwal, Fremont, CA (US);
Sai Ganesh Sitharaman, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 78 days.

(21) Appl. No.: 12/651,351

(22) Filed: Dec. 31, 2009

(65) Prior Publication Data

US 2011/0161489 A1 Jun. 30, 2011

(51) Int. Cl.
*G06F 15/173* (2006.01)

(52) U.S. Cl. ........................................ 709/224; 709/238

(58) Field of Classification Search .................. None
See application file for complete search history.

(56) References Cited

U.S. PATENT DOCUMENTS

| 6,151,324 | A  | * | 11/2000 | Belser et al. ................. 370/397 |
| 6,449,279 | B1 | * | 9/2002  | Belser et al. ................. 370/397 |
| 7,646,708 | B2 | * | 1/2010  | McGee et al. ................ 370/229 |
| 2009/0073989 | A1 | * | 3/2009 | Cai et al. ................. 370/395.53 |
| 2009/0109998 | A1 | * | 4/2009 | Vinayagam et al. ......... 370/465 |

* cited by examiner

*Primary Examiner* — John B. Walsh
(74) *Attorney, Agent, or Firm* — Harrity & Harrity, LLP

(57) ABSTRACT

A virtual device includes multiple devices connected to operate as a single device. A first one of the devices is configured to determine that the first device connects to a second one of the devices via a first link; identify a second link; determine that the second link connects the first device to the second device; and automatically aggregate the first link and the second link to form a link aggregation with the second device based on determining that the first device connects to the second device via both the first and second links. The first device is further configured to transmit packets to the second device via the first and second links of the link aggregation.

22 Claims, 10 Drawing Sheets

AUTOMATIC AGGREGATION OF INTER-DEVICE PORTS/LINKS IN A VIRTUAL DEVICE

BACKGROUND INFORMATION

A virtual device includes a collection of devices connected together to operate as a single device. It is common to provide some redundancy in the connections between the devices. Thus, if a particular link, between two devices, goes down, then there exists another path via which the two devices can communicate with each other.

SUMMARY

According to one implementation, a virtual device may include multiple devices connected to operate as a single device. A first one of the devices may discover a second one of the devices, determine that the first device connects to the second device via multiple links, and automatically aggregate the multiple links to form a link aggregation with the second device based on determining that the first device connects to the second device via the multiple links The first device may transmit traffic to the second device via each of the multiple links of the link aggregation.

According to another implementation, a virtual system may include multiple devices connected to operate as a single device. A first one of the devices ("first device") may include means for determining that the first device is connected to a second one of the devices ("second device"), means for determining that the first device connects to the second device via multiple links, means for automatically aggregating the links to form a link aggregation with the second device based on determining that the first device connects to the second device via multiple links, and means for transmitting traffic to the second device over one or more of the links, of the link aggregation, using a load balancing technique.

According to a further implementation, a method may be performed by a first device of a group of devices connected to operate as a single device. The method may include determining that the first device connects to a second device, of the group of devices, via a first link; identifying a second link; determining that the second link connects the first device to the second device; automatically aggregating the first link and the second link to form a link aggregation with the second device based on determining that the first device connects to the second device via both the first and second links, and transmitting packets to the second device via the first and second links of the link aggregation, where one or more of the packets are transmitted via the first link and another one or more of the packets are transmitted via the second link.

BRIEF DESCRIPTION OF THE DRAWINGS

The accompanying drawings, which are incorporated in and constitute a part of this specification, illustrate one or more systems and/or method described herein and, together with the description, explain these systems and/or methods. In the drawings.

DETAILED DESCRIPTION

The following detailed description refers to the accompanying drawings. The same reference numbers in different drawings may identify the same or similar elements.

Figure 1:
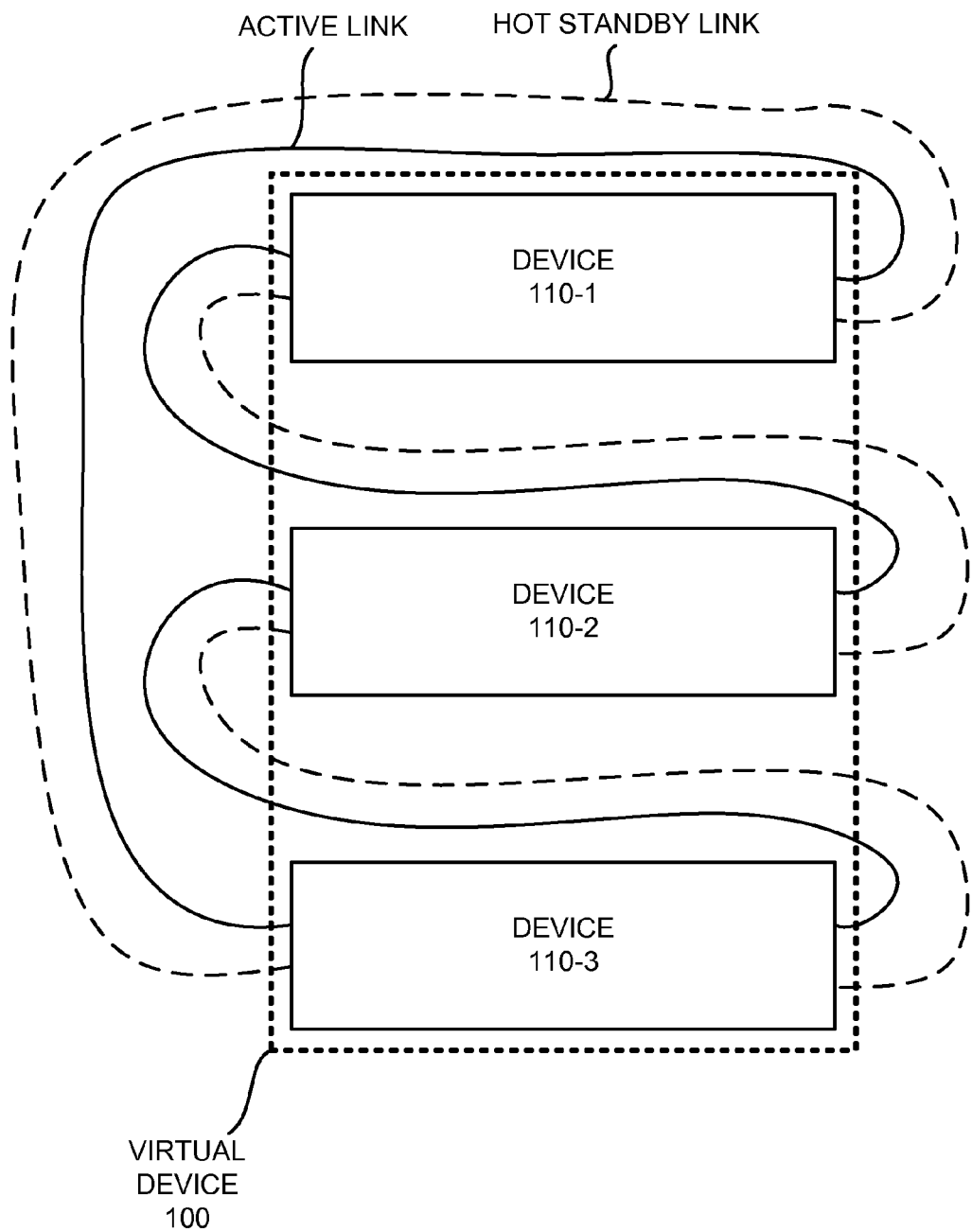
FIG. 1 is a diagram of a virtual device with redundant links between devices.

FIG. 1 is a diagram of a virtual device 100 with redundant links between devices. As shown in FIG. 1, virtual device 100 includes three devices 110-1, 110-2, and 110-3 (collectively referred to as "devices 110," and individually as "device 110") connected via an active link and a hot standby link. For example, device 110-1 connects to device 110-2 via an active link and a hot standby link and connects to device 110-3 via an active link and a hot standby link; device 110-2 connects to device 110-1 via an active link and a hot standby link and connects to device 110-3 via an active link and a hot standby link; and device 110-3 connects to device 110-1 via an active link and a hot standby link and connects to device 110-2 via an active link and a hot standby link.

Device 110 may use the active link to transmit traffic to another device 110. The hot standby link may be used in case of a failure on an active link. When a failure occurs on an active link, a device 110 may cause the traffic, for the failed link, to be switched over to the hot standby link. Some traffic loss occurs during the switch-over from the failed link to the hot standby link. Also, bandwidth, on the links, is not fully utilized in that no traffic is transmitted on the hot standby link unless a failure occurs on the active link.

According to an implementation described herein, a virtual device may automatically aggregate links between devices and transmit traffic over the aggregated links. The term "traffic," as used herein, may refer to a single data packet and/or control packet, or a series of data packets and/or control packets. The term "packet," as used herein, is intended to refer to any form or arrangement of information whether in packet form or in non-packet form.

Figure 2:
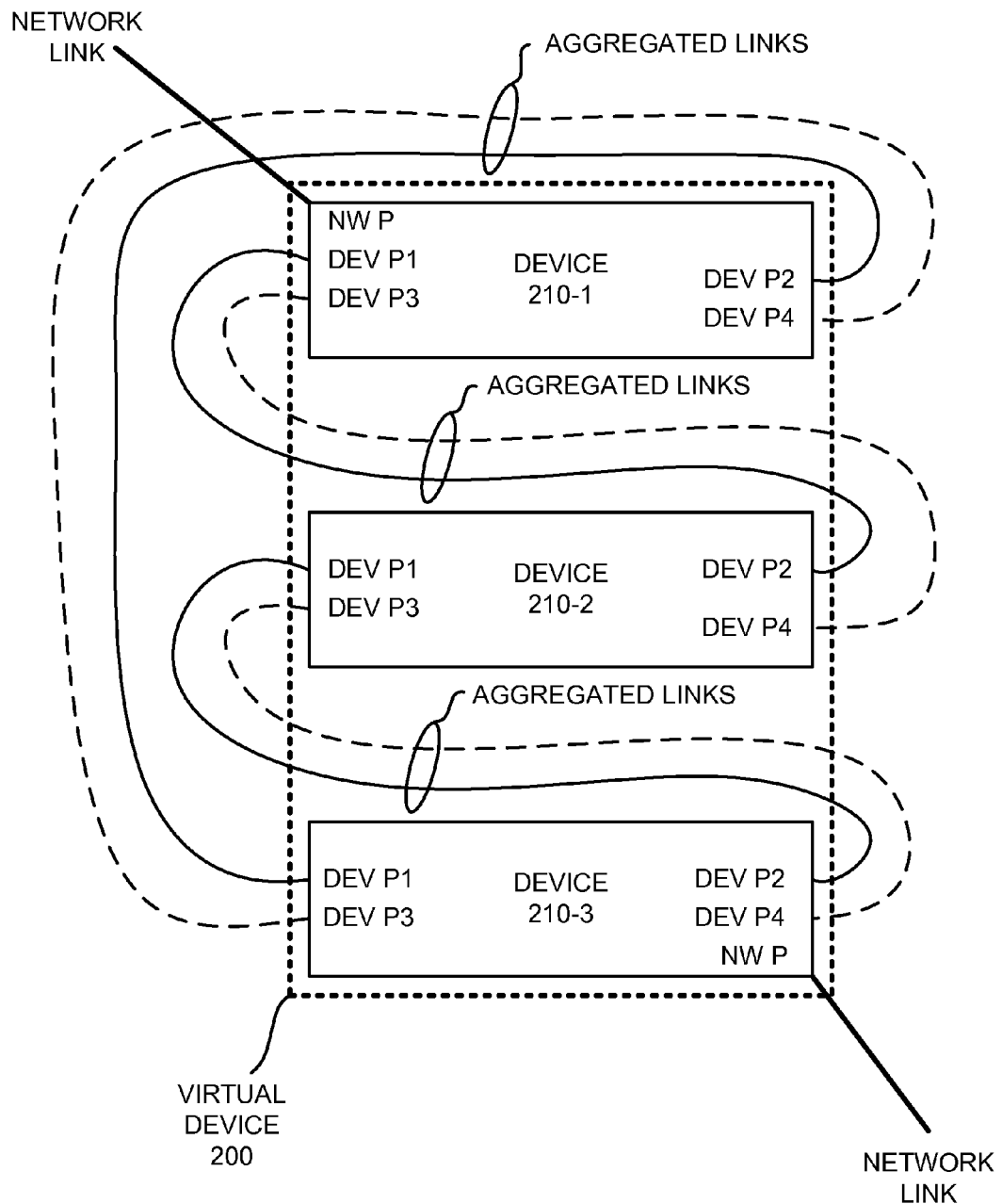
FIG. 2 is a diagram of an exemplary virtual device according to an implementation described herein.

FIG. 2 is a diagram of an exemplary virtual device 200 according to an implementation described herein. As shown in FIG. 2, virtual device 200 may include a collection of devices 210-1, 210-2, and 210-3 (referred to collectively as "devices 210," and individually as "device 210") that operate together as a single device. Device 210-1 may connect to device 210-2 via a set of device links (shown as aggregated links), and may connect to device 210-3 via a set of device links (shown as aggregated links). Device 210-2 may connect to device 210-1 via a set of device links (shown as aggregated links), and may connect to device 210-3 via a set of device links (shown as aggregated links). Device 210-3 may connect to device 210-1 via a set of device links (shown as aggregated links), and may connect to device 210-2 via a set of device links (shown as aggregated links).

While FIG. 2 shows a particular quantity of devices 210, the particular quantity of devices 210 is purely for illustration purposes. In practice, there may be fewer or additional devices 210 forming virtual device 200. Also, while FIG. 2 shows a particular topology of devices 210, the particular topology is purely for illustration purposes. In practice, the topology of devices 210, of virtual device 200, may differ. For example, there may be fewer or additional device links connecting any two devices 210. Further, the quantity of device links connecting one set of devices 210 may differ from the quantity of device links connecting another set of devices 210. Also, a particular device 210 may connect, via one or more device links, to one other device 210, or two or more other devices 210 in another implementation.

Device 210 may include a network device, such as a routing device, a switching device, a firewall device, a server device, or the like, or a non-network device, such as a computing device. While devices 210 can be implemented as different types of devices, in the following paragraphs, devices 210 will be described in terms of a network device.

As shown in FIG. 2, each device 210 may include a number of ports, such as one or more network ports (NW P) and/or one or more device ports (DEV P). A network port may include a port that connects to a link, such as a network link, that connects to a device external to virtual device 200. A device port may include a port that connects to a link, such as a device link, that connects one device 210 to another device 210 within virtual device 200.

Figure 3A:
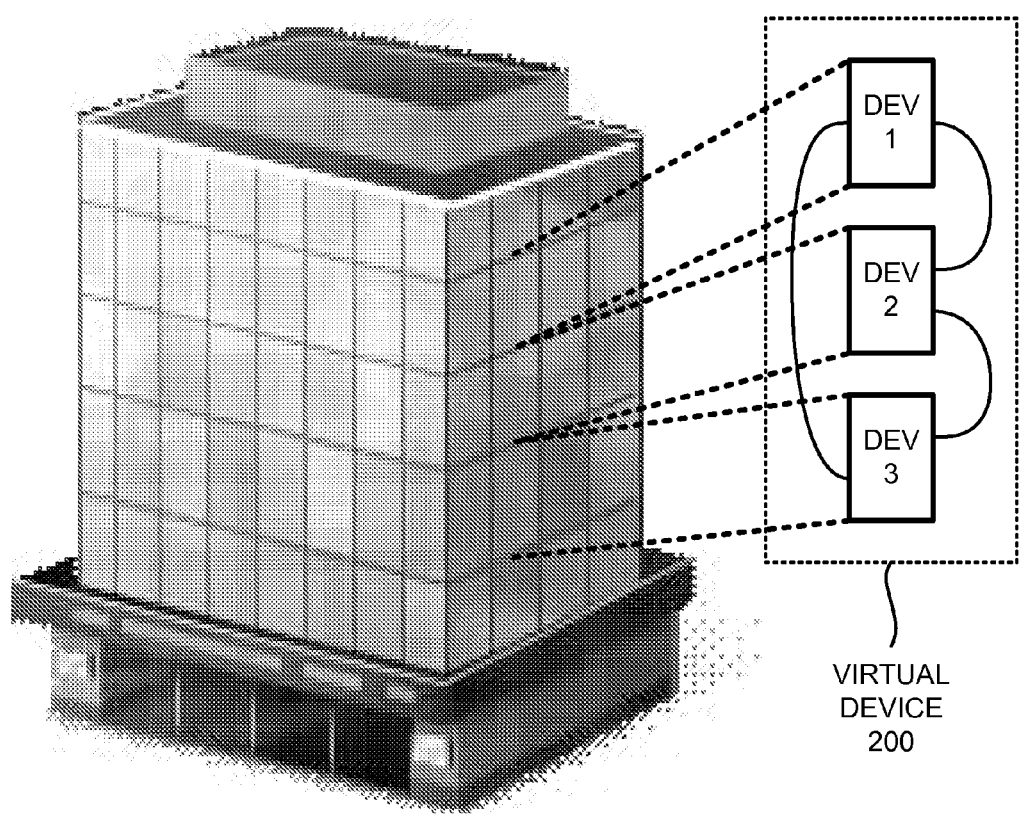
FIG. 3A is a diagram illustrating a possible distributed deployment of devices, of a virtual device, within a building.
Figure 3B:
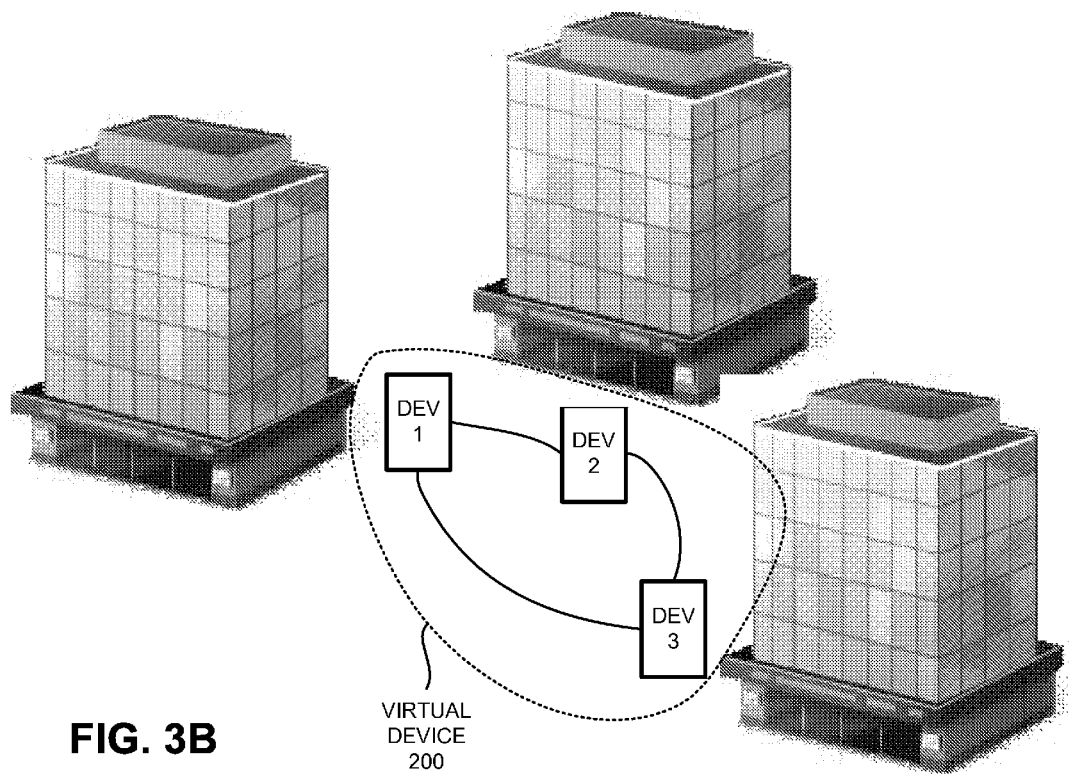
FIG. 3B is a diagram illustrating a possible distributed deployment of devices, of a virtual device, within a campus of buildings.

Devices 210, of virtual device 200, may be physically located on one or more racks in one or more buildings. Devices 210 may be physically located next to each other or separated by distances of up to 100 km or more (e.g., between 50 to 100 km). FIG. 3A is a diagram illustrating a possible distributed deployment of devices 210, of virtual device 200, within a building. For example, as shown in FIG. 3A, devices 210-1, 210-2, and 210-3 may be located on different floors of the building, and connected to form virtual device 200. FIG. 3B is a diagram illustrating a possible distributed deployment of devices 210, of a virtual device 200, within a campus of buildings. For example, as shown in FIG. 3B, devices 210-1, 210-2, and 210-3 may be located in different buildings, and connected to form virtual device 200.

Figure 4:
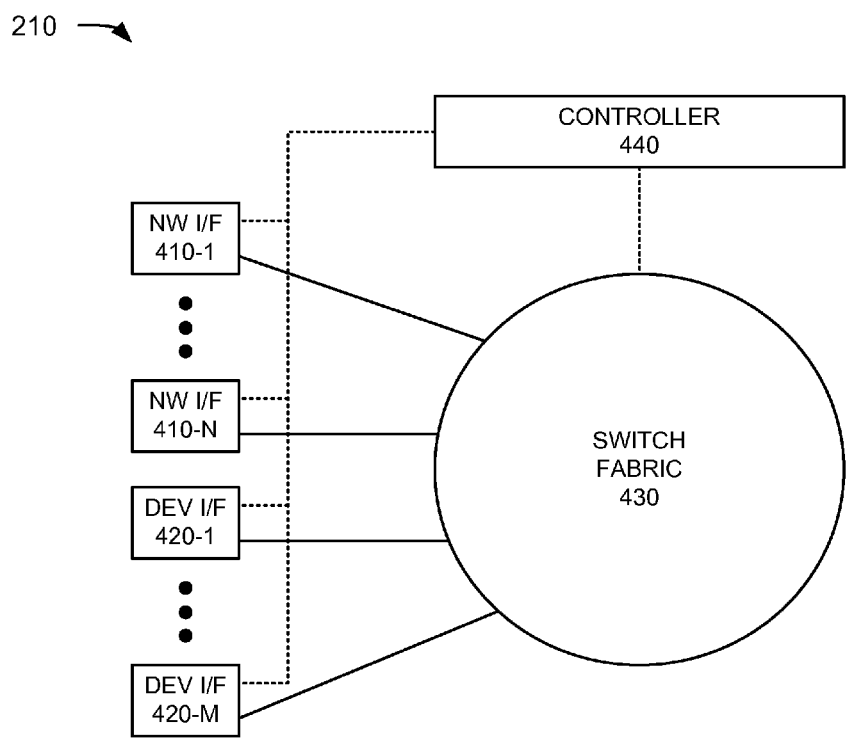
FIG. 4 is a diagram of exemplary components of a device of FIG. 2.

FIG. 4 is a diagram of exemplary components of a device 210. As shown in FIG. 4, device 210 may include network interfaces 410-1, . . . , 410-N (collectively referred to as "network interfaces 410," and individually as "network interface 410") (where N>1), device interfaces 420-1, . . . , 420-M (collectively referred to as "device interfaces 420," and individually as "device interface 420") (where M>1), switch fabric 430, and controller 440. In another implementation, device 210 may include fewer, additional, different, or differently arranged components than those illustrated in FIG. 4. Also, a function described as being performed by one of the components may be alternatively performed by another one of the components.

Network interface 410 may include a component to receive, transmit, and/or process traffic on a network link. For example, network interface 410 may include an Ethernet interface, an optical carrier (OC) interface, an asynchronous transfer mode (ATM) interface, or another type of interface. Network interface 410 may manage a set of one or more input ports via which packets can be received, a set of one or more output ports via which packets can be transmitted, and/or a set of one or more input/output ports via which packets can be received and transmitted. In one implementation, a network interface 410 may function as an input interface that receives packets on the network link and processes the packets. In another implementation, a network interface 410 may function as an output interface that processes packets and transmits the packets on the network link. In yet another implementation, a network interface 410 may function as both an input interface and an output interface.

Figure 5A:
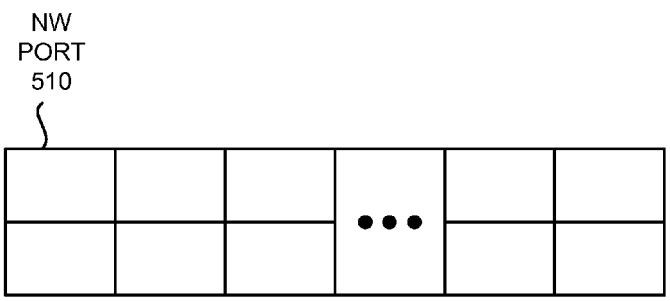
FIG. 5A is a diagram illustrating exemplary network ports of one or more network interfaces of FIG. 4.

FIG. 5A is a diagram illustrating exemplary network ports 510 of one or more network interfaces 410. Network ports 510 may be visible on the exterior structure of device 210. Network ports 510, illustrated in FIG. 5A, may be associated with one or more network interfaces 410. A network port 510 may be capable of transmitting packets for long distances (e.g., up to 100 km or more). In one implementation, a network port 510 may be converted to a port for a device interface 420. This may be beneficial to provide additional bandwidth for inter-device 210 communications, and/or to facilitate the connection of devices 210 at long distances.

Returning to FIG. 4, device interface 420 may include a component to receive, transmit, and/or process traffic on a device link (i.e., a link connecting two devices 210). For example, device interface 410 may include an Ethernet interface, an OC interface, or another type of interface. Device interface 420 may manage a set of one or more input ports via which packets can be received, a set of one or more output ports via which packets can be transmitted, and/or a set of one or more input/output ports via which packets can be received and transmitted. In one implementation, device interface 420 may function as an input interface that receives packets on a device link and processes the packets. In another implementation, device interface 420 may function as an output interface that processes packets and transmits the packets on a device link. In yet another implementation, device interface 420 may function as both an input interface and an output interface.

Figure 5B:
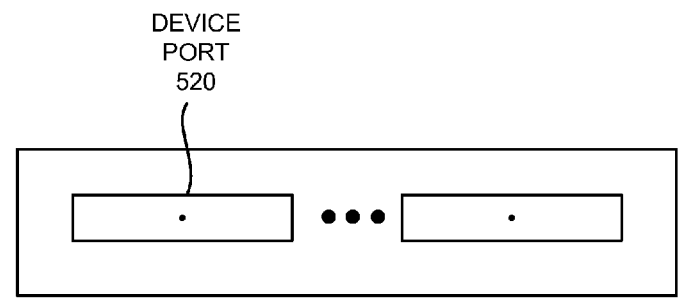
FIG. 5B is a diagram illustrating exemplary device ports of one or more device interfaces of FIG. 4.

FIG. 5B is a diagram illustrating exemplary ports 520 of one or more device interfaces 420. Device ports 520 may be visible on the exterior structure of device 210. Device ports 520, illustrated in FIG. 5B, may be associated with one or more device interfaces 420.

Returning to FIG. 4, switch fabric 430 may include one or more switching planes to facilitate communication among interfaces 410/420 and/or controller 440. In one implementation, each of the switching planes may include a single or multi-stage switch of crossbar elements. In another implementation, each of the switching planes may include some other form of switching elements. Switch fabric 430 may also, or alternatively, include processors, memories, and/or paths that permit communication among controller 440 and interfaces 410/420.

Controller 440 may include one or more processors, microprocessors, application specific integrated circuits (ASICs), field programming gate arrays (FPGAs), and/or processing logic that may be optimized for networking and/or communications. Controller 440 may also include a static memory (e.g. a read only memory (ROM)), a dynamic memory (e.g. a random access memory (RAM)), onboard cache, and/or flash memory for storing data and/or machine-readable instructions. Controller 440 may communicate with other devices 210, of virtual device 200, to exchange information regarding the topology of virtual device 200 and/or to monitor the state of the device links. In one implementation, controller 440 may create a routing table based on the topology of virtual device 200, create a forwarding table based on the routing table, and making forwarding decisions based on the forwarding table.

As described below, controller 440 may automatically determine when device 210 (of which controller 440 is a component) connects to another device via more than one device link. In this case, controller 440 may aggregate traffic on the device links, thereby making efficient use of the bandwidth that exists between two devices 210 of virtual device 200.

Figure 6:
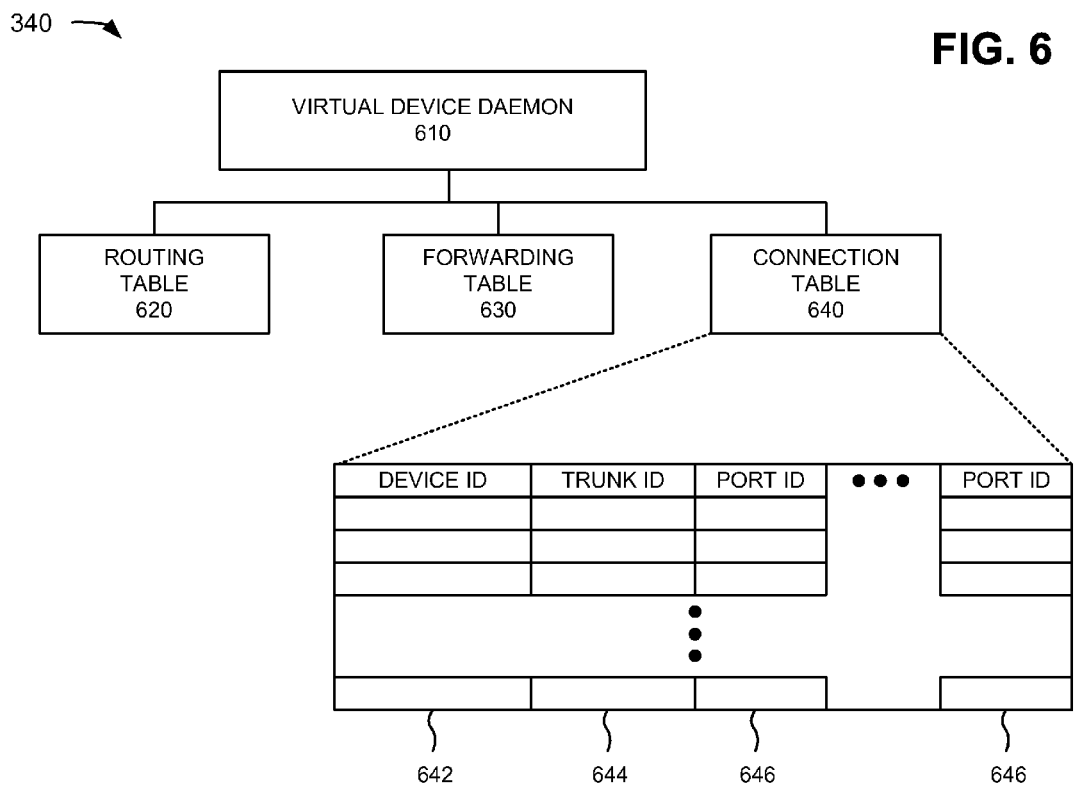
FIG. 6 is a diagram illustrating exemplary functional components of the controller of FIG. 3.

FIG. 6 is a diagram illustrating exemplary functional components of controller 440. As shown in FIG. 6, controller 440 may include virtual device daemon 610, a routing table 620, a forwarding table 630, and a connection table 640. In another implementation, controller 440 may include fewer, additional, or different functional components than are shown in FIG. 6. Furthermore, a function described as being performed by one of the functional components may be alternatively performed by another functional component.

Virtual device daemon 610 may discover neighboring devices 210, may identify adjacencies, may aggregate device links, and/or may monitor the state (e.g., link up or down state) of the device links For example, virtual device daemon 610 may send hello packets on the device links to discover neighboring devices 210. Virtual device daemon 610 may then perform a handshaking operation with a neighboring device 210. Virtual device daemon 610 may identify adjacencies by identifying which device port 520 connects to which neighboring device 210. Based on the adjacencies, virtual device daemon 610 may identify device links that can be aggregated. For example, if virtual device daemon 610 determines that device 210 (with which virtual device daemon 610 is associated) connects to a particular device 210 via device port 1 and device port 3, virtual device daemon 610 may determine that device ports 1 and 3 can be aggregated, thereby aggregating the device links connected to device ports 1 and 3.

Virtual device daemon 610 may generate and/or update routing table 620 based on the topology of virtual device 200. For example, virtual device daemon 610 may obtain information, regarding the topology of virtual device 200, from other devices 210 in virtual device 200. Virtual device daemon 610 may also obtain information, from devices 210, regarding the network links and/or device links to which devices 210 connect. Virtual device daemon 610 may store at least some of this information in routing table 620. Virtual device daemon 610 may use routing table 620 to identify, for example, an egress device 210 to which a received packet is to be sent before the packet exits virtual device 200.

Virtual device daemon 610 may generate forwarding table 630 based on routing table 620. For example, virtual device daemon 610 may identify a particular (next hop) device 210 to which to send a packet that is intended for an egress device 210. Virtual device daemon 610 may periodically perform a shortest path calculation (i.e., identify a path to use to reach a particular egress device 210) and store the result of the calculation in forwarding table 630. A technique for performing a shortest path calculation includes, among others, the Dijkstra algorithm or the Bellman-Ford algorithm. The shortest path calculation may take into account, not only the number of hops to reach a particular egress device 210, but also the cost of taking each of these hops. The cost of traversing a device link may be a function of the bandwidth available on that device link. In the case of a link aggregation, the cost may be a function of the combined bandwidth of the aggregated device links.

In one implementation, virtual device daemon 610 may perform a new shortest path calculation each time that the topology of virtual device 200 changes (e.g., when a device link comes up or goes down, when a new device 210 is added, etc.). In another implementation, virtual device daemon 610 may perform a shortest path calculation at another time that may be independent of the changing of the topology of virtual device 200. In one implementation, forwarding table 630 may store information that identifies a particular (next hop) device 210 for a particular egress device 210.

Virtual device daemon 610 may generate and/or update connection table 640 based on the identified adjacencies and determined device link aggregations. For example, virtual device daemon 610 may determine that two device links can be aggregated and may store information regarding the device link aggregation in connection table 640.

Connection table 640 may include a device identifier (ID) field 642, a trunk ID field 644, and one or more port ID fields 646. In another implementation, connection table 640 may contain fewer, additional, or different fields than are shown in FIG. 6.

Device ID field 642 may store information identifying a neighboring device 210, such as a numerical identifier, an address, or some other information that uniquely identifies a device 210 in virtual device 200. Trunk ID field 644 may store information (e.g., a trunk identifier) identifying a particular adjacency with neighboring device 210 identified in device ID field 642. In the case of a link aggregation (i.e., two or more device links) that exists with neighboring device 210 identified in device ID field 642, the trunk identifier may represent the combination of two or more device ports 520 associated with the link aggregation. In the case of no link aggregation that exists with neighboring device 210, the trunk identifier may represent the single device port 520 associated with the device link connecting to neighboring device 210. Port ID field 646 may store information that uniquely identifies a device port 520 to which neighboring device 210, identified in device ID field 642, connects via a device link. When a link aggregation exists with neighboring device 210, then one or more other port ID fields 646 may store information that uniquely identifies other device ports 520 to which neighboring device 210, identified in device ID field 642, connects via a device link.

Virtual device daemon 610 may program one or more components of device 210 with the information in connection table 630 so that these one or more components may utilize the bandwidth of the link aggregation by transmitting packets (e.g., control and/or data packets) over all of the device links of the link aggregation.

Figure 7:
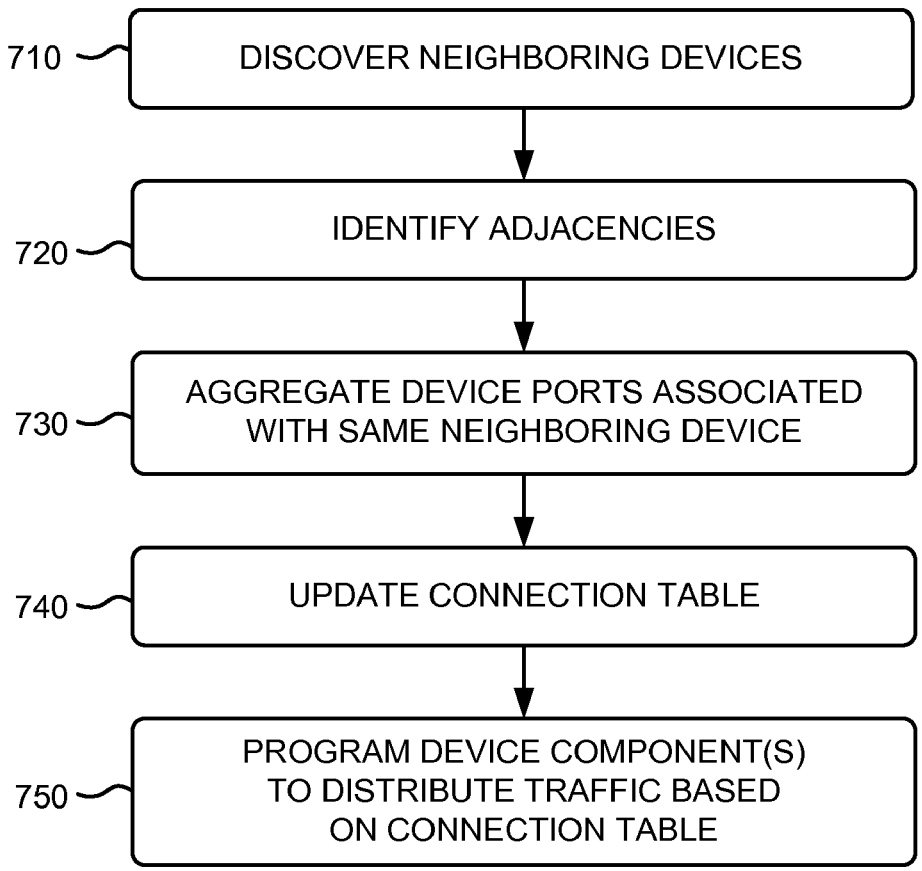
FIG. 7 is a flowchart of an exemplary process for automatically aggregating ports of a virtual device.

FIG. 7 is a flowchart of an exemplary process 700 for automatically aggregating ports of a virtual device. Process 700 may be performed by a device 210 in virtual device 200. In one implementation, process 700 may be performed separately by each device 210 in virtual device 200. For the description to follow, process 700 will be described as being performed by a particular device 210 of virtual device 200.

Process 700 may include discovering neighboring devices 210 (block 710). For example, virtual device daemon 610, of the particular device 210, may be notified, by another component of the particular device 210, of an active device link (i.e., a device link that is in the up state). In other words, when a device interface 320 determines that an active device link is connected to one of its device ports 520, device interface 320 may notify virtual device daemon 610. Virtual device daemon 610 may transmit hello packets on all active device links. A neighboring device 210, that receives a hello packet, may respond to the hello packet with a reply (e.g., an acknowledgement).

In response to a reply from a neighboring device 210, virtual device daemon 610 may perform a three-way handshake with a virtual device daemon 610 of the neighboring device 210 (hereinafter "neighboring virtual device daemon 610"). For example, virtual device daemon 610 may send a packet to neighboring virtual device daemon 610 indicating that the particular device 210 has seen the neighboring device 210 for the first time. The neighboring virtual device daemon 610 may respond by sending a packet, back to virtual device daemon 610, indicating that the neighboring device 210 has also seen the particular device 210. Virtual device daemon 610 may send another packet to neighboring virtual device daemon 610 confirming that the particular device 210 has seen the neighboring device 210 and that the neighboring device 210 has seen the particular device 210, thereby completing the three-way handshake.

Adjacencies may be identified (block 720). For example, virtual device daemon 610 may identify, for each of the neighboring devices 210 that virtual device daemon 610 has discovered, a device port 520 via which the particular device 210 connects to the neighboring device 210 via a device link. As a result of identifying the adjacencies, virtual device daemon 610 may know which neighboring devices 210 that the particular device 210 connects to and via which device ports 520.

Device ports 520, associated with a same neighboring device 210, may be aggregated (block 730). For example, virtual device daemon 610 may identify a neighboring device 210 to which the particular device 210 connects via multiple device ports 520. In this case, virtual device daemon 610 may aggregate the multiple device ports 520, thereby aggregating the bandwidth available on the device links connected to these multiple device ports 520.

Connection table 640 may be updated (block 740). For example, virtual device daemon 610 may create, or update, an entry in connection table 640 to reflect the link aggregation of the multiple device ports 520. For aggregated device ports 520, virtual device daemon 610 may assign a trunk identifier to the link aggregation. Virtual device daemon 610 may store information identifying the neighboring node 210 in device ID field 642, the trunk identifier in trunk ID field 644, and information identifying the multiple device ports 520 in port ID fields 646.

Virtual device daemon 610 may create, or update, an entry in connection table 640 for each device port 520 via which the particular device 210 connects to a neighboring device 210, regardless of whether that device port 520 has been aggregated. For a non-aggregated device port 520, virtual device daemon 610 may assign a trunk identifier to the non-aggregated device port 520. Virtual device daemon 610 may store information identifying the neighboring node 210 in device ID field 642, the trunk identifier in trunk ID field 644, and information identifying the non-aggregated device port 520 in port ID field 646.

One or more device components may be programmed to distribute traffic based on connection table 640 (block 750). For example, virtual device daemon 610 may program one or more hardware components, of the particular device 210, to distribute traffic based on the information in connection table 640. For a link aggregation, the one or more hardware components may distribute traffic, on the device links, using a load balancing technique or some other technique that may attempt to fully utilize the bandwidth on the device links.

Figure 8:
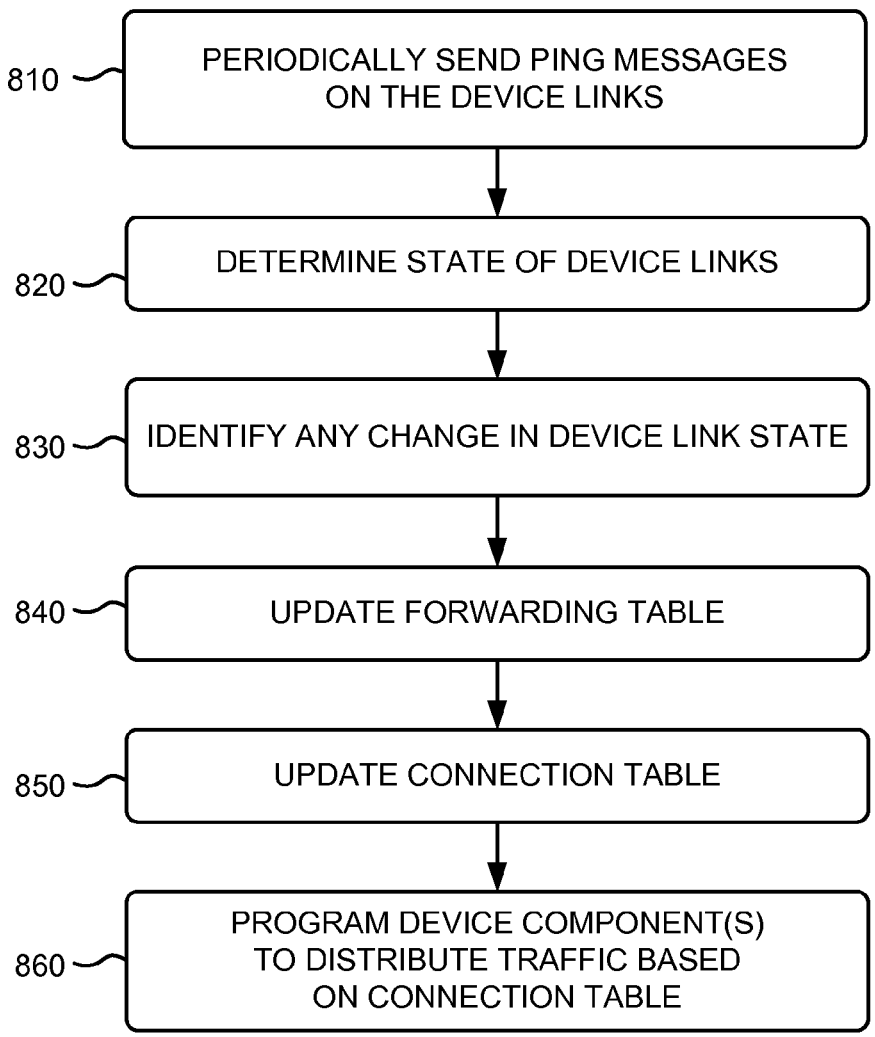
FIG. 8 is a flowchart of an exemplary process for handling a state change of a device link.

FIG. 8 is a flowchart of an exemplary process 800 for handling a state change of a device link. Process 800 may be performed by a device 210 in virtual device 200. In one implementation, process 800 may be performed separately by each device 210 in virtual device 200. For the description to follow, process 800 will be described as being performed by a particular device 210 of virtual device 200.

Process 800 may include periodically sending ping messages on the device links (block 810). For example, virtual device daemon 610 may periodically (e.g., at some designated frequency) transmit ping messages (e.g., hello and/or keep alive packets) on all of the device links to which its device ports 520 connect. The purpose of the ping messages is to monitor the state of the device links. Device links can be generally in one of two states: a link up state or a link down state. The link up state may reflect that the device link is operable and the components, on a neighboring device 210 connected to that device link, are operable and capable of communicating on the device link. The link down state may reflect that either the device link has failed (i.e., the device link is inoperable) or that the components, on a neighboring device 210 connected to that device link, have failed (i.e., the device link is operable, but a soft failure or a component failure has occurred at neighboring device 210). Thus, the ping messages can detect these soft failures or component failures that do not actually cause the device link to become inoperable.

The state of the device links may be determined (block 820), and a change in the state of the device links may be identified (block 830). For example, virtual device daemon 610 may determine whether responses were received on the device links in response to the ping messages. In one implementation, virtual device daemon 610 may identify that a device link is in the down state when a single response has not been received on that device link. In another implementation, virtual device daemon 610 may identify that a device link is in the down state when no response has been received on that device link for a particular number of ping messages transmitted on that device link. For example, virtual device daemon 610 may determine that a device link is in the down state when no response has been received for three consecutive ping messages.

When there is a change in the link state of a device link, virtual device daemon 610 may update forwarding table 630 (block 840). For example, virtual device daemon 610 may perform a new shortest path calculation based on the change in the link state. When a device link, of a link aggregation, changes to the down state, then virtual device daemon 610 may change the cost of transmitting traffic over the remaining device link(s) as a function of the bandwidth of the remaining device link(s). When a device link changes to the up state (e.g., when a device link that was previously in the down state changes to the up state or when a new device link is added), virtual device daemon 610 may change the cost of transmitting traffic over the device link as a function of the bandwidth of the device link. If the device link forms a link aggregation with one or more other device links, then virtual device daemon 610 may change the cost of transmitting over the link aggregation as a function of the bandwidth of the link aggregation. Virtual device daemon 610 may perform a new shortest path calculation based on the changed cost. Virtual device daemon 610 may update forwarding table 630, if necessary, based on the new calculations.

When there is a change in the link state of a device link, virtual device daemon 610 may also update connection table 640 (block 850). In one implementation, virtual device daemon 610 may update its adjacencies by, for example, identifying a new adjacency, removing a previously-identified adjacency, or changing an existing adjacency. As a result of updating the adjacencies, virtual device daemon 610 may know which neighboring devices 210 that the particular device 210 connects to and via which device ports 520.

Virtual device daemon 610 may identify a neighboring device 210 to which the particular device 210 connects via multiple device ports 520, a neighboring device 210 to which the particular device 210 connects via a single device port 520, and/or a neighboring device 210 to which the particular device 210 no longer connects, For a neighboring device 210 to which the particular device 210 connects via multiple device ports 520, virtual device daemon 610 may aggregate the multiple device ports 520, thereby aggregating the bandwidth available on the device links connected to these multiple device ports 520.

Virtual device daemon 610 may update connection table 640 based on the updating of the adjacencies. For example, virtual device daemon 610 may create, update, or remove an entry in connection table 640 to reflect the updated adjacencies. For a new link aggregation, virtual device daemon 610 may assign a trunk identifier to the link aggregation. In one implementation, virtual device daemon 610 may create a new entry in connection table 640 for the link aggregation and remove an existing entry relating to a device port 520 of the new aggregation. In another implementation, virtual device daemon 610 may update the existing entry, in connection table 640, to reflect the new link aggregation. In either event, the entry, in connection table 640, may store information identifying the neighboring node 210 in device ID field 642, the trunk identifier in trunk ID field 644, and information identifying the multiple device ports 520 in port ID fields 646.

For a change to an existing link aggregation, virtual device daemon 610 may update the entry, in connection table 640, corresponding to the link aggregation. For example, virtual device daemon 610 may delete information regarding one or more device ports 520 that is/are no longer part of the link aggregation. This may result in one or more device ports 520 continuing to connect to neighboring device 210 associated with the entry in connection table 640. For an adjacency that no longer exists, virtual device daemon 610 may remove an entry from connection table 640.

One or more device components may be programmed to distribute traffic based on connection table 640 (block 860). For example, virtual device daemon 610 may program one or more hardware components, of the particular device 210, to distribute traffic based on the information in connection table 640. In the case of a link aggregation, the one or more hardware components may distribute traffic, on the device links of the link aggregation, using a load balancing technique or some other technique that may attempt to fully utilize the bandwidth on the device links In the case of no link aggregation, then the one or more hardware components may transmit traffic over the device link connected to the neighboring device 210. As a result, practically no traffic is lost due to a change in the device link state.

Figure 9:
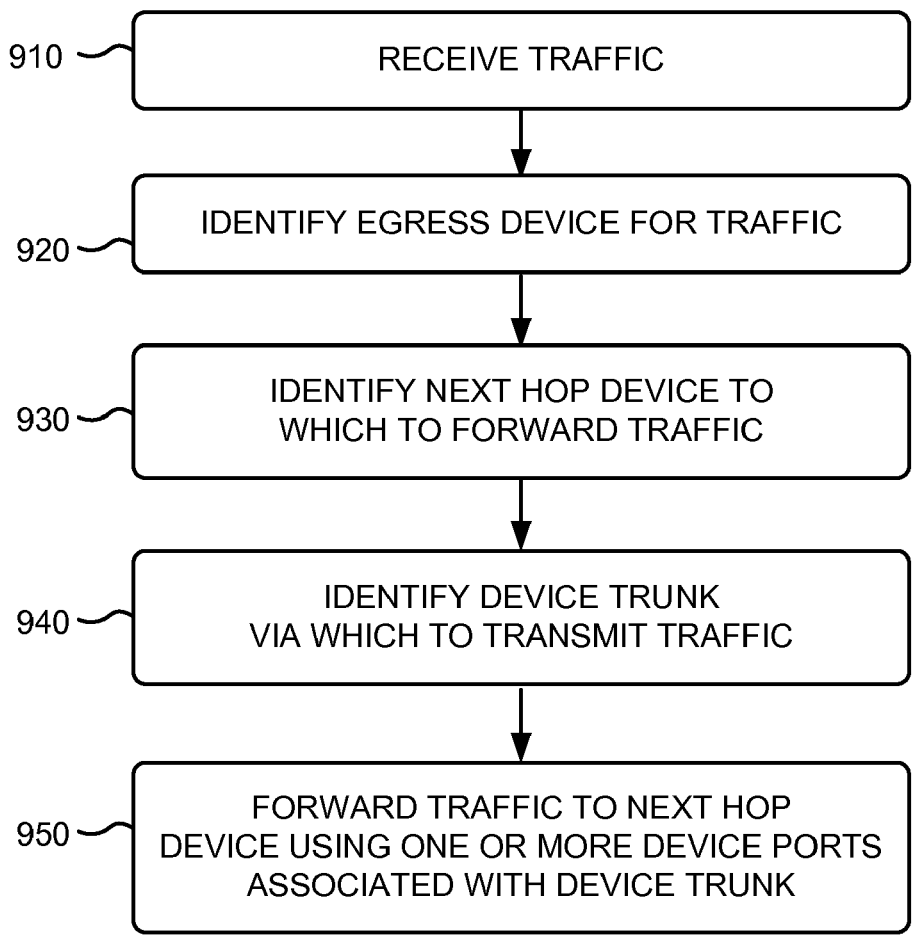
FIG. 9 is a flowchart of an exemplary process for transmitting traffic within a virtual device.

FIG. 9 is a flowchart of an exemplary process for transmitting a packet within virtual device 200. Process 900 may be performed by a device 210 in virtual device 200. In one implementation, process 900 may be performed separately by each device 210 in virtual device 200. For the description to follow, process 900 will be described as being performed by a particular device 210 of virtual device 200.

Process 900 may include receiving traffic (block 910). For example, assume that the particular device 210 receives traffic (e.g., a data packet or a control packet) on a network link via a network port 510 of a network interface 310. The traffic may include certain information, such as information identifying the destination of the traffic (e.g., an address of the destination of the traffic).

An egress device 210, within virtual device 200, for the traffic may be identified (block 920). For example, the particular device 210 may perform a lookup operation in routing table 620 to determine, based on the destination of the traffic, the identity of an egress device 210 via which the traffic is to be transmitted for the traffic to reach the destination. In one implementation, the particular device 210 may use the information regarding the destination of the traffic to identify a device 210 (i.e., the egress device 210), within virtual device 200, that has the network port 510 via which the traffic is to be transmitted.

The next hop device 210, to which to forward the traffic, may be identified (block 930). For example, the particular device 210 may perform a lookup operation in forwarding table 630 to determine, based on the identity of egress device 210, the identity of a next hop device 210 via which the traffic is to be transmitted for the traffic to reach egress device 210 based on its shortest path calculation. In one implementation, the particular device 210 may use the information regarding the egress device 210 to identify a device 210 (i.e., the next hop device 210), within virtual device 200, to which the traffic is to be transmitted.

A device trunk, via which to transmit the traffic, may be identified (block 940). For example, the particular device 210 may determine, based on information from connection table 630 and based on the identity of next hop device 210, the identity of a device trunk via which the traffic is to be transmitted for the traffic to reach next hop device 210. As described above, a device trunk may correspond to a single device port 520 or an aggregation of multiple device ports 520.

The traffic may be forwarded to the next hop device 210 via one or more device ports 520 associated with the device trunk (block 950). For example, as described above, in a situation where the device trunk corresponds to a device link aggregation, one or more hardware components of the particular device 210 may be programmed to use a load balancing technique, or the like, to distribute the traffic over the multiple device ports 520 associated with the device link aggregation. In a situation where the device trunk corresponds to a single device link, one or more hardware components of the particular device 210, may be programmed to transmit data via the device port 530 associated with the single device link. A device interface 320, responsible for the identified device port(s) 520, may receive the traffic and output the traffic on the device link(s) connected to the identified device port(s) 520.

If the next hop device 210 is the egress device, the egress device 210 may process the traffic and transmit the traffic on a network link, where the traffic exits virtual device 200. If the next hop device 210 is not the egress device, the next hop device 210 may process the traffic in a manner similar to that described above and forward the traffic to another next hop device 210 or the egress device 210. Eventually, when the traffic reaches the egress device 210, the egress device 210 may process the traffic and transmit the traffic on a network link, where the traffic exits virtual device 200.

An implementation, described herein, may automatically identify device links, within a virtual device, that may be aggregated and aggregate the links so that the bandwidth of the links may be efficiently utilized. When a link changes state, the link may be easily added to or removed from a link aggregation and communication may continue with minimal-to-no loss of traffic. Also, shortest path calculations may be updated to reflect the state change of the link so that traffic may be efficiently transmitted within the virtual device.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other implementations. Further, non-dependent blocks may be performed in parallel.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a processor).

Further, three separate tables have been described: a routing table, a forwarding table, and a connection table. In another implementation, two or more of these tables may be combined into a single table. The term "table," as used herein, may refer to any searchable form or arrangement of data within a memory device.

Also, reference has been made to aggregating links It is intended that the aggregation of links be synonymous to the aggregation of the ports to which these links are connected.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A virtual device, comprising:
a plurality of devices connected to operate as a single device, where the plurality of devices includes a first device and a second device; and
where the first device is to:
transmit, via a plurality of ports, messages to discover one or more of the plurality of devices, including the second device,
identify, based on discovering the one or more of the plurality of devices, one or more of the plurality of ports connected to each of the discovered plurality of devices,
determine, based on the identifying, that the first device connects to the second device via a plurality of links, where each of the plurality of links is associated with a different one of the plurality of ports,
automatically aggregate the plurality of links to form a link aggregation with the second device based on determining that the first device connects to the second device via the plurality of links, and
transmit traffic to the second device via each of the different ones of the plurality of ports.

2. The virtual device of claim 1, where the first device is further to:
create, in a table and based on the identifying and the determining, an entry that stores information regarding the second device and information associated with each of the plurality of links.

3. The virtual device of claim 1, where the first device is further to:
program one or more hardware components, of the first device, to distribute traffic on the plurality of links, via the different ones of the plurality of ports, using a load balancing technique.

4. The virtual device of claim 1, where the first device is further to:
monitor a state of each of the plurality of links,
determine, based on the monitoring, that one of the plurality of links changed from a link up state to a link down state,
remove the one of the plurality of links from the link aggregation to leave one or more of the plurality of links when the one of the plurality of links changed from the link up state to the link down state, and
transmit traffic over the one or more of the plurality of links after removing the one of the plurality of links from the link aggregation.

5. The virtual device of claim 1, where the first device is further to:
receive information regarding a topology of the virtual device,
identify, based on the received information, an egress device, of the plurality of devices, where a received packet is transmitted to the egress device to be transmitted from the virtual device, and
perform, based on received information, a shortest path calculation to to determine a path, for forwarding the received packet to the egress device, as a function of a total bandwidth available on the link aggregation.

6. The virtual device of claim 5, where, when transmitting the traffic to the second device, the first device is to:
receive traffic on a network link,
identify the egress device to receive the traffic,
determine, based on the shortest path calculation, that the traffic is to be sent to the second device, and
transmit the traffic to the second device over one or more of the plurality of links of the link aggregation, via one or more of the different ones of the plurality of ports.

7. The virtual device of claim 5, where the first device is further to:
identify a new link connected to the second device, where the new link is associated with another one of the plurality of ports,
automatically aggregate, based on identifying the new link, the new link with the link aggregation to form a new link aggregation, and
perform a new shortest path calculation to determine a path, for forwarding the received packet to the egress device, as a function of a total bandwidth available on the new link aggregation.

8. The virtual device of claim 7, where, when transmitting the traffic to the second device, the first device is to:
receive traffic on a network link,
identify the egress device to receive the traffic, determine, based on the new shortest path calculation, that the traffic is to be sent to the second device, and transmit, via at least one of the plurality of ports, the traffic to the second device over one or more of the plurality of links of the new link aggregation.

9. The virtual device of claim 1, where the first device is further to:
identify a new link connected to the second device, where the new link is associated with another one of the plurality of ports, and
automatically, based on identifying the new link, aggregate the new link with the link aggregation to form a new link aggregation.

10. The virtual device of claim 1, where the plurality of devices include a plurality of network devices that are connected to operate as a single network device.

11. The virtual device of claim 1, where at least two of the plurality of devices are separated geographically by a distance of between 50 kilometers and 100 kilometers.

12. A virtual system, comprising:
a plurality of devices, including a first device and a second device, connected to operate as a single device, and
where the first device comprises one or more components to:
discover, via one or more messages transmitted via a plurality of ports of the first device, other ones of the plurality of devices, including the second device,
identify, based on discovering the other ones of the plurality of devices, one or more of the plurality of ports connected to each of the other ones of the plurality of devices,
determine, based on identifying the one or more of the plurality of ports, that the first device is connected to the second device,
identify, based on identifying the one or more of the plurality of ports, a plurality of links and corresponding ones of the plurality of ports that connect the first device to the second device,
automatically aggregate, based on identifying the plurality of links and the corresponding ones of the plurality of ports, the plurality of links to form a link aggregation with the second device, and
transmit, via one or more of the corresponding ones of the plurality of ports, traffic to the second device over one or more of the plurality of links, of the link aggregation, using a load balancing technique.

13. The virtual system of claim 12, where the one or more components are further to:
monitor a state of each of the plurality of links,
determine, based on the monitoring, that one of the plurality of links changed to a link down state,
remove the one of the plurality of links from the link aggregation to leave a remaining one or more of the plurality of links when the one of the plurality of links changed to the link down state, and
transmit traffic over the remaining one or more of the plurality of links after removing the one of the plurality of links from the link aggregation.

14. The virtual system of claim 12, where the one or more components are further to:
receive information regarding a topology of the virtual system,
determine, based on the received information, a device, of the plurality of devices, for transmitting received packets from the virtual system, and
perform a shortest path calculation, for forwarding the received packets through the virtual system and to the determined device as a function of a total bandwidth available on the link aggregation; and where, when transmitting the traffic to the second device, the one or more components are to:
receive traffic on a network link,
identify the determined device to receive the traffic,
determine, based on the shortest path calculation, that the traffic is to be sent to the determined device via the second device, and
transmit the traffic to the second device over the one or more of the plurality of links of the link aggregation.

15. A method performed by a first device, of a plurality of devices connected to operate as a single device, the method comprising:
transmitting, via one or more of a plurality of device ports, messages to discover other ones of the plurality of devices;
identifying, based on discovering the other ones of the plurality of devices, at least one of the plurality of device ports connected to each of the other ones of the plurality of devices;
determining, based on identifying the at least one of the plurality of device ports, that the first device connects to a second device, of the plurality of devices, via a first link associated with a first device port of the plurality of device ports, and a second link associated with a second device port of the plurality of device ports that is different from the first device port;
automatically aggregating, based on determining that the first device connects to the second device via the first device port and the second device port, the first link and the second link to form a link aggregation with the second device, and
transmitting, via the first device port and the second device port, a plurality of packets to the second device via the first link and the second link of the link aggregation, based on aggregating the first link and the second link, where one or more of the plurality of packets are transmitted via the first link and another one or more of the plurality of packets are transmitted via the second link.

16. The method of claim 15, further comprising:
storing information that associates the second device with the link aggregation; and
using the stored information to program one or more components of the first device to distribute the plurality of packets across the first link and the second link.

17. The method of claim 15, further comprising:
monitoring a state of the first link and the second link;
determining, based on the monitoring, that a particular link, of the first link and the second link, changed to a link down state;
removing the particular link from the link aggregation to leave a remaining link, of the first link and the second link, in response to determining that the particular link changed to the link down state; and
transmitting a packet on the remaining link after removing the particular link from the link aggregation.

18. The method of claim 15, further comprising:
receiving, via the plurality of device ports, information regarding a topology associated with the plurality of devices; and
performing a shortest path calculation to one of the plurality of devices as a function of a total bandwidth available on the link aggregation.

19. The method of claim 18, where transmitting the plurality of packets to the second device includes:
receiving, via a network port of the first device, a packet on a network link, identifying the one of the plurality of devices to receive the packet, determining, based on the shortest path calculation, that the packet is to be sent to the second device, selecting the first link or the second link on which to transmit the packet to the second device, and transmitting the packet on the selected first link or the selected second link.

20. The method of claim 18, further comprising:

identifying a third link connected to the second device, where the third link is associated with a third device port, of the plurality of device ports, that is different from the first device port and the second device port;

automatically aggregating, based on identifying the third link, the third link with the link aggregation to form a new link aggregation; and performing a new shortest path calculation to the one of the plurality of devices as a function of a total bandwidth available on the new link aggregation.

21. The method of claim 20, where transmitting the plurality of packets to the second device includes:

receiving, via a network port of the first device, a packet on a network link, identifying the one of the plurality of devices to receive the packet, determining, based on the new shortest path calculation, that the packet is to be sent to the second device, selecting the first link, the second link, or the third link for transmitting the packet to the second device, and transmitting, via the first device port, the second device port, or the third device port, the packet on the first link, the second link, or the third link based on the selecting.

22. The method of claim 15, further comprising:

identifying a third link connected to the second device via a third device port of the plurality of device ports; and automatically aggregating the third link with the link aggregation to form a new link aggregation based on identifying the third link.

* * * * *